United States Patent
Seppälä et al.

(10) Patent No.: US 11,203,707 B2
(45) Date of Patent: Dec. 21, 2021

(54) COLD-CRYSTALLIZING MATERIAL AND METHOD FOR UTILIZING COLD-CRYSTALLIZATION IN HEAT STORING

(71) Applicant: Aalto University Foundation sr, Aalto (FI)

(72) Inventors: Ari Seppälä, Espoo (FI); Salla Puupponen, Espoo (FI)

(73) Assignee: Aalto University Foundation sr, Aalto (FI)

( * ) Notice: Subject to any disclaimer, the term of this patent is extended or adjusted under 35 U.S.C. 154(b) by 0 days.

(21) Appl. No.: 16/346,894

(22) PCT Filed: Nov. 2, 2017

(86) PCT No.: PCT/FI2017/050758
§ 371 (c)(1),
(2) Date: May 2, 2019

(87) PCT Pub. No.: WO2018/083383
PCT Pub. Date: May 11, 2018

(65) Prior Publication Data
US 2019/0316017 A1 Oct. 17, 2019

(30) Foreign Application Priority Data
Nov. 2, 2016 (FI) .......................... 20160266

(51) Int. Cl.
*C09K 5/06* (2006.01)
*F28D 20/02* (2006.01)

(52) U.S. Cl.
CPC ............ *C09K 5/063* (2013.01); *F28D 20/028* (2013.01)

(58) Field of Classification Search
CPC ....... C09K 5/063; F28D 20/028; F28D 20/02; Y02E 60/14
USPC ....................... 252/76, 77, 79, 73
See application file for complete search history.

(56) References Cited

U.S. PATENT DOCUMENTS

| | | |
|---|---|---|
| 4,077,390 A | 3/1978 | Stanley et al. |
| 4,462,224 A | 7/1984 | Dunshee et al. |
| 10,174,236 B2 * | 1/2019 | Miura ............... C08L 29/04 |
| 2003/0114317 A1 * | 6/2003 | Benton ............... C09K 8/12 507/200 |
| 2012/0148845 A1 | 6/2012 | Kouyama et al. |
| 2017/0088761 A1 | 3/2017 | Miura et al. |
| 2019/0093960 A1 * | 3/2019 | Chopard ............ F28D 20/026 |

FOREIGN PATENT DOCUMENTS

| | | |
|---|---|---|
| EP | 0754744 A1 | 1/1997 |
| EP | 3000859 A1 | 3/2016 |
| JP | 2016069510 A | 5/2016 |
| WO | WO2015141866 A1 | 9/2015 |

OTHER PUBLICATIONS

CAS reg. No. 110-26-9, Nov. 16, 1984. (Year: 1984).*
"N,N'-Methylenebisacrylamide", Wikipedia, 2 pages, (Year: 2020).*
Palomo et al: New sugar alcoholsmixtures for long-term thermal energy storage applications at temperatures between 70 C and 100 C. Solar Energy Materials and Solar Cells, Elsevier Science Publisher, Nov. 7, 2016. vol. 155, pp. 454-468.
Wu: Preparation and Application of Three-dimensional Network Carrier and Shape-stabilized Phase Change Materials. China Master's Theses Full-text Database, Engineering Science and Technology. Vol. I, No. 06.
English Translation of Office Action from Chinese Patent Office, dated Jul. 9, 2021, in Chinese Patent Application No. 201780081979. 1. See pp. 9-10 for explanation of Wu (cite No. 1 above).

* cited by examiner

*Primary Examiner* — Douglas J McGinty
(74) *Attorney, Agent, or Firm* — Laine IP Oy; Mark W. Scott

(57) ABSTRACT

The present invention relates to a cold-crystallizing material having high latent heat, and a method of using the present material for heat storing. The material of the invention comprises of a phase change material and an additive which is preferably a hydrophilic polymer matrix. Preferably, sugar alcohols, such as erythritol or D-mannitol, are used as the phase change material. The polymer of the invention is preferably cross-linked and ionic, i.e. a polyelectrolyte. PCM stores a high amount of heat energy while melting and releases the stored thermal energy by cold-crystallization. Compared to previously studied cold-crystallizing materials, the latent heat of the cold-crystallizing material of the invention is considerably higher, and cold-crystallization is more repeatable in successive melting-crystallization cycles. The material can be used for heat storing. Heat energy can be released from the material by a heat pulse on demand. The method is particularly suitable for long-term heat storing.

13 Claims, 1 Drawing Sheet

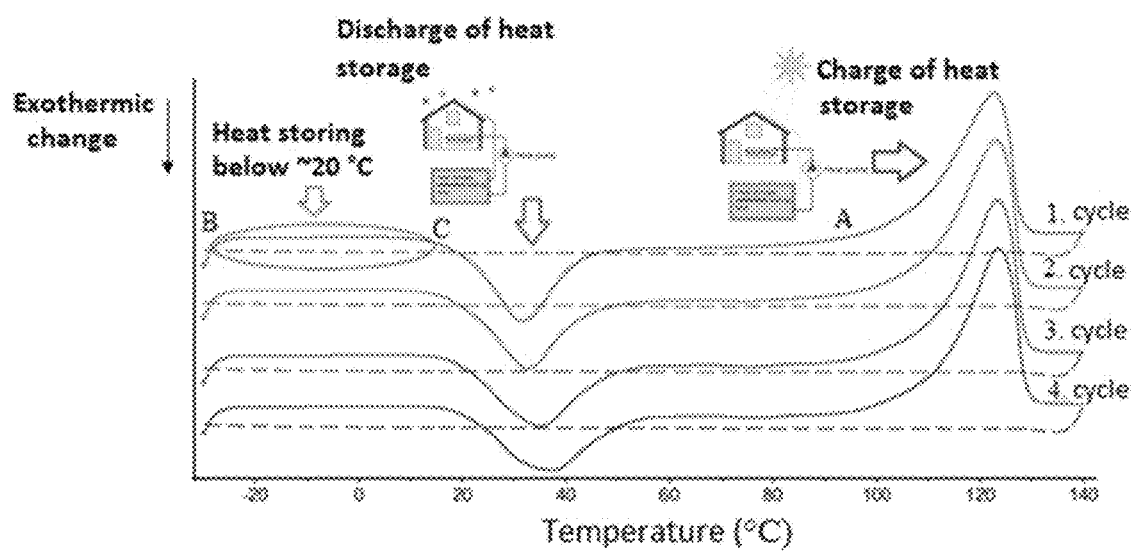

COLD-CRYSTALLIZING MATERIAL AND METHOD FOR UTILIZING COLD-CRYSTALLIZATION IN HEAT STORING

FIELD OF THE INVENTION

The present invention concerns a material composition that cold-crystallizes upon heating, which composition comprises a phase change material.

The present invention also concerns a heat storage material and a heat storage method, the operation of which is based on the above mentioned cold-crystallizing composition, as well as the use thereof.

DESCRIPTION OF RELATED ART

Storing of thermal energy, both in the short and in the long term, has been a major point of interest in research during the recent years. Efficient storing of heat would assist in mitigating present energy problems, relating for example to the increasing energy prices and the demand for more efficient utilization of renewable energy sources. Particularly, extensive use of renewable energy, such as solar energy, requires storing of heat energy due to its irregular availability, in order to constantly meet the demand for renewable energy. Development of short-term heat storage solutions has already advanced much further and working solutions are already being implemented in practice. However, long-term heat storage is clearly more challenging and new solutions for it are required.

An ideal long-term heat storage material stores a great amount of waste heat available (for example solar energy during the summer), stores the recovered heat energy even for several months at small losses, and releases the energy on demand, for example in winter. An efficient, long-term heat storing would be an essential innovation, particularly, in improving the energy efficiency of households and renewable energy sources. Heating of buildings in Finland corresponds to 23% of the overall heat consumption and 80% of the energy consumption of buildings.

Heat storages are classified into techniques based on thermochemistry, sensible heat of the material or latent heat of the material. At present, heat is stored long-term in large size water tanks, the operation of which is based on sensible heat, i.e. on utilization of the specific heat capacity of water. Hot water tanks require an efficient insulation, their energy density is low and heat losses are high in long-term heat storing.

There are no large size, commercial long-term heat storages based on latent heat at present. Latent heat storages are based on utilization of latent heat of melting and crystallization of phase change materials (PCM). Typically, PCMs operate within a narrow temperature range, wherein they are utilized for short-term heat storing, for example for stabilizing temperature changes of buildings during the day. Thus, prevention of any supercooling of a PCM is aimed at by using additives (see for example publications US2012148845A1 and EP0754744A1). Supercooling means a phenomena in which melted material remains in liquid form at a temperature below its equilibrium phase change temperature (usually melting temperature). One of the problems which slows down wider utilization of phase change materials is indeed the fact that the phase change of the material has to occur within the temperature range at which the system works.

Utilization of supercooling of PCM in heat storing has also studied. By means of supercooling heat energy remains stored in a supercooled liquid for a longer term, and the heat is released by crystallization of PCM on demand. Known heat release methods for supercooling phase change materials are common crystallization by cooling, and use of seed crystals (nucleation agent) and the use of electric current.

Publication EP3000859A1 relates to utilization of supercooling of sugar alcohol in heat storing, which sugar alcohol has been stabilized with salt, polyelectrolyte or polymer. Said stabilized sugar alcohols crystallize spontaneously at temperatures in the range of 25-112° C., usually already at storage times of less than a day, depending on composition, which easily exposes the materials to premature crystallization and thus, to a premature heat release from the storage. Heat discharge method presented in the publication is mainly based on electric field induced crystallization by means of Ag/Ag+ particles, or optionally, on traditional crystallization as a result of sufficient cooling which can be accelerated by using a heat output device.

The combination of polymer mixture and sugar alcohol has been studied in US publication 2017088761A1. In the publication, the aim was to find a heat storage material where the changes in the shape of the material would be as small as possible when the heat energy is charged and discharged. In order to achieve this property, a cross-linked polymer mixture and solid-solid phase change are being utilized in the publication.

Supercooling of phase change materials is utilized by also commercially available small-scale heat packages, in this respect respect is made to, for example, US publications 4077390A and 4462224A. In heat packages, heat energy is stored in a supercooled salt hydrate, typically being a sodium acetate trihydrate. Stored heat is released by bending a metallic strip, i.e. so-called activator, inside the package, or by adding a nucleation agent straight into the supercooled salt hydrate (disposable heat package). When bending the strip, small salt hydrate crystals are released from its cracks/cuts, which crystals initialize the crystallization of PCM. Thus, the heat release of heat packages is based on heterogeneous crystallization by means of a nucleation agent.

The above described heat storage technologies based on supercooling of PCM are difficult to utilize in long-term, large size heat storages due to i) metastability of the supercooled state—spontaneous crystallization of PCM is likely to take place with increasing storage time and size, and ii) lack of an efficient, scalable and repeatable heat release technology.

SUMMARY OF THE INVENTION

It is an aim of the present invention to eliminate at least some of the problems associated with the prior art and to provide a new type of material composition and a method for storing heat energy.

In particular, the aim is to extend heat storage time of existing heat storage solutions and improve repeatability of heat release technology.

One aim of the invention is to provide a method that enables long-term heat storing diverging from current solutions.

The present invention is based on latent heat of a phase change material and, especially, on cold-crystallization.

Cold-crystallization is a phenomenon where a melted material crystallizes only in subsequent heating after cooling. In order to cold-crystallize, the melted material acquires pre-cooling, i.e. cooling either close or below the glass transition temperature ($T_g$) of the material. Material vitrifies when temperature of the material decreases below its glass transition temperature. In a glassy state material is solid but amorphous from its structure.

It has been found in the present invention, that by means of a cold-crystallizing material, a heat storage material is obtained to be more stable for storing and repeatability of its melting-crystallization cycle improves significantly. This is highly affected by strong increase in viscosity of the material, and optionally by vitrification in the end, when cooling, which prevents the orientation of PCM molecules into a crystal structure despite of a long storage time. PCM is able to crystallize only in a subsequent heating by cold-crystallization, when the viscosity of the material decreases sufficiently.

In a heat storage method according to this invention, operation of which method is based on cold-crystallizing material according to the invention, melting and cold-crystallization of PCM is utilized for storing and releasing of heat.

More precisely, the solution according to the present invention is mainly characterized by what is stated in the characterizing parts of the independent claims.

Considerable advantages are obtained by means of the present invention. Thus, PCM of the presented composition stores high amount of heat energy while melting and releases the stored thermal energy by cold-crystallization. Compared to previously studied cold-crystallizing materials, latent heat of the cold-crystallizing material of the invention is significantly higher and cold-crystallization is more repeatable in successive melting-crystallization cycles.

Material can be used for a heat storing where the operation principle of the storage is based on melting, cooling close or below the glass transition temperature of the material (heat storing), and cold-crystallization (heat release) of the PCM. Heat energy can be released from the material by a small heat pulse or heating on demand.

The method is particularly suitable for long-term heat storing but it can also be used in short-term heat storages.

The phase change material of the cold-crystallizing material composition stores high amount of heat while melting and releases the stored heat energy while cold-crystallizing, such as presented above.

BRIEF DESCRIPTION OF THE DRAWING

FIG. 1 shows the general operation principle of a heat storage material, according to one embodiment of the present invention, as long-term heat storage.

EMBODIMENTS

The cold-crystallizing material of the present invention generally comprises a phase change material and an additive. The material is particularly suitable to be used as a heat storage material.

In general, latent heat of previously studied/developed cold-crystallizing materials is mostly very low, or cold-crystallization is not repeatable for several phase change cycles, making the phenomenon of utilizing thermal properties impractical.

The present solution relates to a cold-crystallizing material which comprises a phase change material and an additive, i.e. another component, which is typically polar, ionic or polar and ionic.

The material, according to one embodiment, has a remarkable latent heat (even ~400 MJ/m³ in an equilibrium phase change temperature, depending on composition) and cold-crystallization is repeatable for several melting-crystallization cycles.

Repeatability of cold-crystallization and high phase change heat make the material suitable for heat storing applications. Thus, the present solution particularly relates to a heat storage material and a heat storage method, operation of which is based on the above mentioned cold-crystallizing material.

Phase change materials are materials which have ability to store and release a high amount of heat in connection with phase changes. Most commonly, particularly a phase transition between solid and liquid phase is utilized in heat storing and releasing. In addition to a melting heat, i.e. a latent heat that binds to the material while its transition from a solid to a liquid, a melting temperature and a density of the material are included as essential characteristics of a phase change material. By means of the density of the material, it is possible to evaluate the volume of a particular phase change material that is needed to store a particular amount of energy. Whereas the melting heat has a significant relevance for the energy needed to melt the material and for applications.

Necessary pre-cooling, i.e. how close to its glass transition temperature the material needs to be cooled in order the material to stabilize and cold-crystallize in subsequent heating, depends on the composition of the material. For example, in the case of erythritol- and D-mannitol-sodium polyacrylate compositions, according to some embodiments of the present invention, the material does not have to be cooled below the glass transition temperature but close to it is sufficient. According to one embodiment, it is sufficient for these compositions, that the ratio ($T/T_g$) between pre-cooling temperature (T) and end temperature of glass-transition ($T_g$) is below 1.1 in kelvins.

At a temperature of less than the cold-crystallization temperature ($T_{cc}$) of the pre-cooled material according to the present invention, the material is able to store heat energy for long-term without a spontaneous crystallization, i.e. heat release, and preferably, the material neither crystallizes even when adding nucleation agent to it. Thus, the heat storing of the material is not sensitive to contaminants of the environment or to the surface roughness of the storage tank, such as several previously developed heat storage materials.

Particularly, the material can be used in such storing applications where the temperature of the storage is constantly maintained below the $T_{cc}$ of the material in order to prevent the heat release. The $T_{cc}$ of the material depends on the structure of the material. For example, the $T_{cc}$ of erythritol-sodium polyacrylate material, according to one embodiment of the present invention, can be adjusted to a temperature range of 0-80° C. depending on composition of the material.

Heat discharge can be initialized by a heat pulse or by heating the material above its $T_{cc}$, wherein the PCM of the material composition cold-crystallizes. Preferably, the amount of energy required to the heat pulse is small. While crystallizing, the temperature of the material increases towards the equilibrium phase change temperature (practically melting temperature).

In the present invention, the terms "material", "composition" or "material composition", respectively, relate to a composition of matter which contains a phase change material and an additive that are mixed with each other. The expression "PCM-polymer composition" has the same meaning.

FIG. 1 shows a general operation principle of the heat storage material, according to one embodiment of the present invention, as long-term heat storage.

Heat energy is stored into the material by melting PCM of the material (phase change of endothermic melting can be seen as a peak in DSC (differential scanning calorimetry) curves at ~100° C., point A). Heating cycles are shown as solid curves. In cooling cycles (dashed curves) phase changes do not occur. The phase change material crystallizes in subsequent heating cycle by cold-crystallization (phase change of exothermic crystallization can be seen as downward peak in DSC curves at ~20° C., point C). FIG. 1 shows four heating-cooling cycles of the material, which cycles correspond the use of the heat storage method in four years when the heat storing and releasing cycles are annual. It can be found from the FIGURE that melting and crystallization of the material remain similar in successive phase transformation cycles.

According to one embodiment, the amount of the phase change material in the material composition is preferably over 50% by mass, and thus the amount of the additive is under 50% by mass, of the total weight of the composition.

According to preferred embodiment, the phase change material needs to be supercooling.

This kind of phase change material can be for example sugar alcohol, polymer, salt hydrate or salt compound or any combination of these.

In one embodiment, an additive or additional component, such as polymer, included in the material stabilizes the supercooled state of the phase change material so that the material is supercooled without crystallization even when cooled slowly.

According to preferred embodiment, an additive or additional component, such as polymer, included in the material stabilizes the supercooled state of the phase change material always close to the glass transition point and below it, which enables the cold-crystallization of the material when it is heated above the cold-crystallization temperature.

The supercooling phase change material remains in its liquid form even when the temperature decreases below its phase change temperature. By further cooling of the supercooled material, a deeply supercooled state will be approached, where the viscosity of the material increases fast and the probability of crystallization of the phase change material molecules decreases. By further cooling, a glass transition point is achieved, where the viscosity of the material corresponds to the viscosity of a solid material but the phase change material is in glassy state. Thus, the structure of the material is amorphous, i.e. the material lacks a long range order but local organized molecule configurations may exist, which contributes to the stability of the supercooled state.

According to one preferred embodiment, the phase change material is polar and polymorphic, preferably a sugar alcohol. Melting temperatures of supercooling sugar alcohols are typically ~90-150° C. and latent heats of melting are over 200 MJ/m$^3$. Furthermore, sugar alcohols are non-toxic and inexpensive. Sugar alcohol can be for example erythritol, mannitol, particularly D-mannitol, xylitol, arabitol, sorbitol or threitol, preferably erythritol or D-mannitol, or combination of two or more of these.

In one embodiment, the phase change material consists of sugar alcohol or mixture of two or more sugar alcohols.

It has been found, that pure sugar alcohols may cold-crystallize randomly when the amount of material is really small and cooling rate is high, typically over 50 K/min. However, the cold-crystallization of pure sugar alcohols can not be, neither has been aimed to be, utilized because fast cooling of those is impossible to implement with a practical amount of material, probability of spontaneous crystallization increases with increasing sample size and elimination of nucleation centers is difficult. For example impurities of the sample or surface roughness of the container can act as nucleation centers of supercooled state. Due to these problems, it is essential to combine the phase change material with a suitable additive in the present invention.

According to preferred embodiment, latent heat of the phase change material is as high as possible so that as high amount of heat energy as possible can be stored. Preferably, the latent heat is over 100 kJ/kg, more preferably over 300 kJ/kg. According to one embodiment, the latent heat of the phase change material can be for example in the range of 100-400 kJ/kg.

According to one embodiment, melting point of the phase change material is at a practical level compared to the heating application, for example 30-200° C., preferably 30-100° C. A melting point of a pure PCM can be different to one of a composition formed by a PCM and an additive. Typically, a melting point suitable for heating demand of living spaces is in the range of 30-60° C. and for heating demand of hot water in the range of 60-100° C.

According to preferred embodiment, the additive used is ionic and/or polar. Ionicity and/or polarity of the additive enables stabilization of the supercooled state of the phase change material by preventing movements of the phase change material molecules and thus crystallization due to an increase in viscosity and strong interactions, such as ion-dipole interactions.

According to preferred embodiment, at least one of the components, PCM and additive, comprised by the cold-crystallizing material according to the present invention, is polymeric.

According to one embodiment, an example of a polymeric phase change material is polyethylene glycol (PEG). The polymeric phase change material can be combined with polar and/or ionic, polymeric or non-polymeric additive. A suitable non-polymeric additive can be for example a salt compound.

Molecular weight of PEG can vary within wide limits. In one embodiment, the molecular weight of PEG is 300 g/mole to 10,000,000 g/mole. Typical example of PEG is PEG (400).

Embodiments according to the invention, in which embodiments the additive is a polymer, are presented below. However, the presented embodiments is to be interpreted openly so that those can also be applied to situations where the phase change material is the polymeric component of the composition, both of the components are polymeric or the composition does not include any polymeric component. In the case of a polymeric phase change material, suitable embodiments are particularly those which relates to three-dimensional weblike structure of a polymer. At any case, strong interactions between the phase change material and the additive always require a polar/ionic additive.

According to a preferred embodiment, another component, in addition to the phase change material, used in the material is a polymer. This can be ionic or preferably polar. According to one embodiment, the cold-crystallizing material composition comprises i) a phase change material dispersed in ii) a polymer matrix.

The term "polymer matrix" relates to a three-dimensional, particularly weblike, structure which is formed by polymer chains that are joined together.

According to one preferred embodiment, a polar/ionic polymer is used, which polymer stabilizes the supercooled state of the phase change material by preventing movement of the phase change material molecules and thus crystallization. Typically, this occurs through strong interactions, for example ion-dipole interactions, with polar groups of the phase change material, which interfere mutual interactions of the phase change material molecules, and by increasing the viscosity of the material. Size, i.e. molecular weight, of the polymer has also effect on its ability to stabilize the structure of the material and increase the viscosity. Larger or cross-linked molecule stabilizes the supercooled state better than molecule of a small size.

Preferably, the amount of polymer in the material is as low as possible in order to maintain the latent heat of the material as high as possible. The amount of polymer can be for example 5-40% by weight, preferably for example 5-20% by weight, of the total weight of the material.

According to preferred embodiment, the polymer is a polyelectrolyte having a high charge density. The used polyelectrolyte can be for example polyacrylic acid, partially or completely neutralized polyacrylic acid, poly(sodium styrene sulfonate) polyethylene-imine or polydiallyldimethylammonium chloride, preferably for example sodium polyacrylate.

Preferably, the polymer is viscous and it withstands the temperatures of the heat energy storage process of a particular application. By means of a high viscosity of the polymer, also the formed PCM-polymer composition has a high viscosity, i.e. preferably at least higher viscosity than water. However, the viscosity of the composition can not be too high to completely prevent the crystallization of PCM.

Preferably, the present composition comprises a supercooling phase change material and a polymer which forms a matrix to which the phase change material has been dispersed, particularly evenly dispersed, wherein the melted composition is stable in a supercooled state and the phase change material of the composition is able to cold-crystallize when heating it above the cold-crystallization temperature.

Such composition is able for example to vitrificate as the temperature decreases to the glass transition point or below it.

According to one embodiment polymer is cross-linked, thus forming a three-dimensional polymer matrix to which the phase change material is dispersed. Preferably, the phase change material is evenly dispersed to the three-dimensional polymer matrix. The three-dimensional polymer matrix has particularly effect on repeatability of the crystallization. According to one theory, without limiting any other options, this is based on the ability of the three-dimensional polymer matrix to prevent complete reorientation of the structure of the material while the material is melting, wherein the crystallization in connection with the discharge of heat energy is considerably more likely.

According to one embodiment, a separate cross-linking agent, preferably being polar, is used to the cross-linking of the polymer. The cross-linking agent can be for example ethylene glycol diacrylate, di(ethylene glycol) diacrylate, tetra(ethylene glycol) diacrylate, ethylene glycol dimethacrylate (EGDMA), di(ethylene glycol) dimethacrylate, tri(ethylene glycol) dimethacrylate, N,N'-methylenebisacrylamide or N,N'-(1,2-dihydroxyethylene) bisacrylamide.

The amount of the cross-linking agent in the material is typically less than 5%, preferably 0-2%, more preferably 1-2%, by mass of the total weight of the material, depending on the material composition.

In one embodiment, molecular weight of the polyacrylate polymer is at least 1.000 g/mol, preferably at least about 30.000.000 g/mol, for example about 10.000-20.000.000 g/mol.

In one embodiment, the polyacrylate polymer is at least partially cross-linked and its molecular weight is at least 5.000 g/mol, for example 10.000-15.000.000 g/mol or 50.000-10.000.000 g/mol.

The cold-crystallization temperature, $T_{cc}$, of the material defines at which temperature heat energy can be stored in the material and to which temperature the material needs to be heated to produce crystallization. The $T_{cc}$ of the material depends for example on polarity of the polymer/ionic strength of the polyelectrolyte, and the chemistry and the amount of the PCM and the cross-linking agent in the material. Optimal polarity/ionic strength and the amount of the cross-linking agent depend on the composition of the material. For example, in a sugar alcohol polyacrylate material the amount of cross-linking agent is preferably 1-2% by mass. The cross-linking agent prevents reorientation of the polymer chains while PCM is melting. Thus, the use of the cross-linking agent improves long-term performance of the composite. Preferably, the ionic strength of the used polyelectrolyte has effect on strength of the PCM-polymer interactions: the more there are ion-dipole interactions between the polymer matrix and the PCM, the more efficient the polymer is able to stabilize the supercooled state of the sugar alcohol. However, the ion-dipole interactions can not be so strong that they completely prevent the crystallization of the phase change material. For example, in the case of erythritol-polyacrylate composition, the (molar) degree of neutralization of the polyacrylate is optimally about 5-25% as amount of the sugar alcohol is 65% by mass. In erythritol-polyacrylate composition where the amount of erythritol is 80% by mass, optimal degree of neutralization is preferably about 25-75%.

The present technology also provides a heat storage method that utilizes a melting-cold-crystallization cycle of a material, comprising a PCM and an additive, for heat storing.

According to preferred embodiment, the present material is used in the heat storage method.

According to one embodiment, the cold-crystallizing material is heated to or above the melting point of its phase change material. After the phase change material is melted, the material is allowed to cool or it is cooled at a desired cooling rate. Preferably, the phase change material is supercooling and maintains in a liquid state during cooling.

The material can be cooled close to its glass transition point or below it.

In one embodiment, the ratio ($T/T_g$) between cooling temperature (T) and end temperature of glass transition ($T_g$) is at most about 1.1, preferably below it, in kelvins.

In another embodiment, the material is cooled at least to a temperature (T) which is determined according to the following formula: $T=T_g-1.2T_g$, in kelvins.

In one embodiment where the material is cooled close to the glass transition point, $T_g$, of the composition, it is cooled to a temperature that is at most about 15° C., particularly at most 10° C., preferably at most 5° C., for example 2° C. . . . 0.1° C., higher than the glass transition point.

In another embodiment, the material is cooled to a temperature that corresponds to the glass transition point ($T_g$) of the composition.

In third embodiment, the material is cooled to a temperature that is below the glass transition point ($T_g$). The material is cooled for example to a temperature that is at least 0.1° C., for example at least 1° C., preferably at least 5° C. lower than the glass transition point ($T_g$).

In one embodiment, the temperature is cooled to at least about 10° C., for example at least about 15° C., particularly at least about 20° C., lower than the glass transition point ($T_g$).

The lower the temperature is cooled to, the better it usually is for stability.

In practice, the temperature is generally lowered at the most to a temperature which is 100° C. lower than the glass transition point, $T_g$.

When going close to the glass transition temperature of the phase change material and particularly below it, the phase change material vitrifies to a solid form having an amorphous structure. The material remains non-crystallized as far as the material is kept at a temperature below its cold-crystallization temperature. When the heat energy stored by the material is to be released, a heat pulse is directed to the material, which increases the temperature of the material above its cold-crystallization temperature and the material crystallizes while the heat energy is released. After this, the cycle can be started from the beginning.

According to one embodiment, the cooling rate of the material after melting can be for example 0.01-20 K/min, preferably for example 0.05-5 K/min, for applications preferably under 5 K/min. Typically, the lower the cooling rate that is needed for operation of the heat storage material, the better it is for applications, because efficient cooling of a large amount of material will require much energy and is therefore not as profitable.

According to one embodiment, heat energy can be stored at temperatures lower that the cold-crystallization temperature of the material at least for a week, most preferably at least for four weeks, for example 1-60 months, for example 1-24 months.

According to one embodiment (method 1), the phase change material is evenly dispersed in the polymer matrix in the material composition, according to the invention, comprising the phase change material and the polymer.

Such a composition can be manufactured by first dissolving a polar phase change material in a suitable polar solvent. Most preferably, there is a minimum amount of solvent, in which the PCM remains dissolved without crystallization at the manufacturing temperature of the material.

Hereafter, a monomer is polymerized with a possible cross-linking agent and/or neutralization agent in the PCM solution, wherein PCM is evenly dispersed inside the forming polymer matrix. Polymerization temperature can be for example 30-80° C., according to chemistry of the material.

Polymerization can be initialized fast for example with a radical initiator, or in the case of condensation polymerization for example an acid or a base can be used as catalyst in order to accelerate the polymerization. Preferably, vinyl polymerization is carried out in an inert atmosphere, for example in nitrogen gas. Finally, an excess solvent is evaporated from the composite.

According to one embodiment (method 2), the material can be manufactured also by mixing pre-manufactured or purchased hydrophilic polymer with an aqueous PCM solution. After the PCM solution is absorbed into the polar polymer, the solvent is evaporated from the material. Typically, more optimal material is manufactured by the method 1 because thus the PCM is more homogeneously mixed into the polymer matrix.

When considering the embodiments of the invention, it should be noted that the given reference values relating to the composition, manufacture, operation principle or use, of the material according to the present invention, are extremely dependent on the composition of the material. The given values should not be interpreted as absolute values for the invention but as indicative examples. Mainly, the aim is to obtain as high latent heat as possible by finding a composition which operates with as low cooling rate as possible, which does not have to be cooled to a very low temperature to obtain a stable storage mode (optimal storage mode temperature can be for example room temperature or about 5-10° C. in the case of an uninsulated underground heat storage) and, phase change temperatures of which are suitable for the application.

EXAMPLES

Example 1

Manufacture of Erythritol Polyacrylate Material

Erythritol is dissolved in ion changed water at 60° C. so that the amount of erythritol is about 60% by mass of the weight of the solution (for example 6 g erythritol/10 g erythritol+water). After this, a base, for example NaOH pellets, that is used to neutralize acrylic acid monomer is added to the PCM aqueous solution. The amount of base is adjusted according to a desired ionic strength of the polyelectrolyte. In the case of acrylic acid and monounsaturated base, such as NaOH, neutralization reaction is in a molar ratio of 1:1, i.e. for example when manufacturing 50% polyacrylate, the molar ratio of NaOH:acrylic acid needs to be 1:2. After the manufacture of alkaline solution, acrylic acid monomer together with cross-linking agent is added to the mixture. The cross-linking agent can also be added beforehand to the alkaline PCM aqueous solution. Homogeneous solution is mixed carefully before adding an initiator. As an initiator of polymerization can be used for example peroxide initiator which initiates the polymerization of acrylic acid fast. Typically, polymerization takes 5-20 minutes, and the product is either gel-like or harder, homogeneous polymer material. Polymerization temperature can be for example 50-70° C. The temperature needs to be sufficiently high in order PCM not to crystallize from the solution. Polymerization reaction of acrylic acid is strongly exothermic, i.e. heat releasing reaction, and part of the excess water evaporates from the material already at the polymerization step. Finally, the most, preferably for example 90-95%, of the water remained in the material is evaporated for example by holding the composite preferably at 150° C. overnight.

Example 2

Thermal Properties of Erythritol-Sodium Polyacrylate

Thermal properties of different compositions of erythritol-sodium polyacrylate material were studied by DSC (differential scanning calorimetry) with several consecutive heating-cooling cycles. The cross-linking agent used in the material was EGDMA (ethylene glycol dimethacrylate). Melting temperature ($T_m$), melting heat ($\Delta H_m$), cold-crystallization temperature ($T_{cc}$), crystallization heat ($\Delta H_{cc}$) and glass transition temperature ($T_g$) were measured for the samples. Measurement results are shown in table 1. In the table, $W_{erythritol}$ and $W_{EGDMA}$, describe the mass fractions of erythritol and EGDMA, respectively. X again describes the neutralization degree of polyacrylic acid.

TABLE 1

Thermal properties of erythritol-sodium polyacrylate material.

| Sample | $W_{erythritol}$ | X | $W_{EGDMA}$ | $T_m$ (° C.) | $\Delta H_m$ (J/g) | $T_{cc}$ (° C.) | $\Delta H_{cc}$ (J/g) | $T_g$ (° C.) |
|---|---|---|---|---|---|---|---|---|
| $W_{erythritol}$ series | 0.65 | 0.5 | 0.003 | 96 ± 2 | 89 ± 8 | 70 ± 4 | −94 ± 14 | −34 ± 0.5 |
| | 0.75 | 0.5 | 0.003 | 102 ± 2 | 152 ± 5 | 36 ± 2 | −146 ± 2 | |
| | 0.8 | 0.5 | 0.003 | 106 ± 3 | 193 ± 7 | 24 ± 7 | −123 ± 7 | −37.6 ± 0.5 |
| | 0.9 | 0.5 | 0.003 | 110 ± 1 | 255 ± 6 | 15 ± 5 | −148 ± 6 | |
| X series | 0.65 | 0 | 0.003 | 106 ± 2 | 68 ± 9 | 17 ± 7 | −56 ± 5 | −39.4 ± 0.1 |
| | 0.65 | 0.25 | 0.003 | 105 ± 4 | 175 ± 12 | 41 ± 7 | −166 ± 17 | −36.3 ± 0.1 |
| | 0.65 | 0.5 | 0.003 | 96 ± 2 | 89 ± 8 | 70 ± 4 | −94 ± 14 | −34.9 ± 0.5 |
| | 0.65 | 0.75 | 0.003 | 97 ± 1 | 10 ± 2 | 73 ± 5 | −10 ± 3 | −25 ± 0.2 |
| | 0.65 | 1 | 0.003 | — | — | — | — | −22.4 ± 0.3 |
| | 0.9 | 0.5 | 0.003 | 110 ± 1 | 255 ± 6 | 15 ± 5 | −148 ± 6 | |
| | 0.9 | 1 | 0.003 | 106 ± 6 | 264 ± 10 | 12 ± 4 | −158 ± 7 | −39.2 ± 0.2 |
| $W_{EGDMA}$ series | 0.8 | 0.5 | 0 | 93 ± 1 | 154 ± 3 | 34 ± 8 | −151 ± 7 | — |
| | 0.8 | 0.5 | 1 | 99 ± 2 | 219 ± 7 | 40 ± 7 | −153 ± 7 | — |
| | 0.8 | 0.5 | 2 | 105 ± 1 | 229 ± 12 | 31 ± 3 | −142 ± 8 | — |

Embodiments

On the basis of the foregoing, the invention comprises for example the following embodiments:

1. A PCM-polymer composite, the thermal properties of which can be adjusted through the attractive interactions between the PCM molecules and polar/ionic polymer, wherein the PCM of the melted composite cold-crystallizes in heating.
2. A heat storage material based on embodiment 1, wherein the operation of the heat storage material is based on supercooling and cold-crystallization of the PCM, wherein the latent heat of melting and cold-crystallization of the phase change material is utilized for heat storing and releasing, and the latent heat can be stored in the composite in the long-term when the temperature is below the cold-crystallization temperature of the material.
3. A heat storage method based on embodiment 1 or 2, which method utilizes unique melting-cold-crystallization cycle of the PCM-polymer composite for heat storing, wherein the heat energy is stored when the PCM is melting and the stored heat energy is released by a small heat pulse or heating at least to the cold-crystallization temperature of the material.
4. A composition, comprising a supercooling phase change material and a polymer, wherein the polymer forms a matrix to which the phase change material is dispersed, wherein the melted composition is stable in supercooled state and the phase change material of the composition is able to cold-crystallize when heating it to above cold-crystallization temperature.
5. The composition according to embodiment 4, wherein the phase change material is evenly dispersed inside the polymer matrix.
6. The composition according to embodiment 4 or 5, wherein the phase change material is dispersed inside the polymer matrix by polymerization of a monomer of the polymer in the solution of the phase change material.
7. The composition according to any of the embodiments 4-6, wherein the composition is able to vitrify when the temperature decreases to a glass transition point of the composition or below it.
8. The composition according to any of the embodiment 4-7, wherein the amount of the phase change material is preferably over 50% by weight and the amount of the polymer is 5-40% by weight, preferably less than 20% by weight, of the total weight of the composition.

INDUSTRIAL APPLICABILITY

The material according to the invention is capable of being used as a heat storage material. The heat storage material and method according to the invention can be used both for short-term and long-term heat storing. Particularly, the present material is applicable for use as a long-term heat storage due to its extremely stable supercooled state.

The heat storage material and method according to the present invention can be used on household scale as well as in the industry. As short-term heat storage, the material and method according to the present invention are suitable for example for leveling off temperature differences in buildings, just as traditional heat storage materials. As long-term heat storage, the material and method according to the present invention can be particularly utilized for enhancing utilization of renewable energy, for example by storing heat energy from the sun for winter.

REFERENCE PUBLICATIONS

Patent Literature
US2012148845A1
EP0754744A1
EP3000859A1
US2017088761A1
U.S. Pat. No. 4,077,390A
U.S. Pat. No. 4,462,224A
U.S. Pat. No. 5,188,930A
US20090096137A1

Abbreviations $T_g$, end temperature of glass transition, glass transition point
$T_{cc}$ cold-crystallization temperature
PCM phase change material

The invention claimed is:
1. A thermal energy storage composition comprising:
at least two components, one of which is a supercooling phase change material comprising a sugar alcohol and the other a cross-linked polar and/or ionic polymer which is capable of stabilizing the phase change material when the phase change material is in a supercooled state,
wherein the cross-linked polar and/or ionic polymer interacts with polar groups of the phase change material, wherein, when the composition is cooled to a temperature which at least substantially corresponds to the glass transition point of the phase change material, thermal energy is stored and the phase change material is capable of cold-crystallizing upon heating to a temperature above a cold-crystallization temperature thereof to release the thermal energy, and wherein the cross-linked polar and/or ionic polymer is cross-linked with a cross-linking agent selected from the group consisting of ethylene glycol diacrylate, di(ethylene glycol) diacrylate, tetra(ethylene glycol) diacrylate, ethylene glycol dimethacrylate (EGDMA), di(ethylene glycol) dimethacrylate, tri(ethylene glycol) dimethacrylate, N,N'-(1,2-dihydroxyethylene) bisacrylamide, and any combination thereof.

2. The composition according to claim 1, wherein the composition is capable of vitrification upon cooling to the glass transition point of the composition or below it.

3. The composition of claim 1, wherein the sugar alcohol comprises a member from the group consisting of erythritol, mannitol, particularly D-mannitol, xylitol, arabitol, sorbitol, threitol, and any combination thereof.

4. The composition according to claim 1, wherein an amount of the phase change material is over 50% by weight and an amount of the polar and/or ionic polymer is 5-40% by weight of a total weight of the composition.

5. The composition according to claim 1, wherein the polar and/or ionic polymer comprises a member selected from the group consisting of a polyelectrolyte, a partially or completely neutralized polyacrylic acid, poly(sodium styrene sulfonate) polyethylene-imine, polydiallyldimethylammonium chloride, and a polyacrylate.

6. A method of storing thermal energy comprising:
providing a composition comprising at least two components, a cross-linked polar and/or ionic polymer and the other a supercooling phase change material comprising a sugar alcohol, the supercooling phase change material comprising polar groups, a glass transition temperature, and a cold-crystallization temperature, wherein the cross-linked polar and/or ionic polymer interacts with the polar groups of the phase change material;
melting the phase change material,
cooling the composition to a temperature which at least substantially corresponds to the glass transition temperature of the phase change material to form an amorphous solid in a supercooled state which stores thermal energy therein so long as remaining under the cold-crystallization temperature of the phase change material, wherein the cross-linked polar and/or ionic polymer prevents crystallization of the phase change material in the supercooled state, and
wherein, upon heating of the amorphous solid to at least the cold-crystallization temperature of the phase change material, the amorphous solid cold-crystallizes and releases the stored thermal energy, and
wherein the cross-linked polar and/or ionic polymer is cross-linked with a cross-linking agent selected from the group consisting of ethylene glycol diacrylate, di(ethylene glycol) diacrylate, tetra(ethylene glycol) diacrylate, ethylene glycol dimethacrylate (EGDMA), di(ethylene glycol) dimethacrylate, tri(ethylene glycol) dimethacrylate, N,N'-(1,2-dihydroxyethylene) bisacrylamide, and any combination thereof.

7. The method according to claim 6, wherein the cooling is done at a rate of from 0.015-20 K/min.

8. The method according to claim 6, wherein the composition is cooled to an end temperature (T), wherein a ratio of the end temperature to the glass transition temperature $(T_g)$ is at most about 1.1, in Kelvins.

9. The method according to claim 6, wherein the composition is cooled at least to an end temperature (T) which is determined according to following formula: $T=T_g-1.2T_g$, in Kelvins, wherein $(T_g)$ is the glass transition temperature.

10. The method according to claim 6, wherein the phase change material is dispersed inside the cross-linked polar and/or ionic polymer by polymerization of a monomer of the polymer in solution of the phase change material.

11. The method according to claim 6, wherein an amount of the phase change material is over 50% by weight and an amount of the cross-linked polar and/or ionic polymer is 5-40% by weight of a total weight of the composition.

12. The method according to claim 6, wherein the polar and/or ionic polymer comprises a member selected from the group consisting of a polyelectrolyte, a partially or completely neutralized polyacrylic acid, poly(sodium styrene sulfonate) polyethylene-imine, polydiallyldimethylammonium chloride, and a polyacrylate.

13. A thermal energy storage composition comprising:
at least two components, a cross-linked polar and/or ionic polymer and the other a supercooling phase change material, the supercooling phase change material comprising a sugar alcohol, a glass transition temperature, and a cold-crystallization temperature, wherein the cross-linked polar and/or ionic polymer interacts with the polar groups of the phase change material;
wherein, upon cooling of the composition to a temperature which at least substantially corresponds to the glass transition temperature of the phase change material, the composition forms an amorphous solid in a supercooled state which stores thermal energy therein so long as the amorphous solid remains under the cold-crystallization temperature of the phase change material,
wherein the cross-linked polar and/or ionic polymer prevents crystallization of the phase change material in the supercooled state,
wherein, upon heating of the amorphous solid to at least the cold-crystallization temperature of the phase change material, the amorphous solid cold-crystallizes and releases the stored thermal energy, and
wherein the cross-linked polar and/or ionic polymer is cross-linked with a cross-linking agent selected from the group consisting of ethylene glycol diacrylate, di(ethylene glycol) diacrylate, tetra(ethylene glycol) diacrylate, ethylene glycol dimethacrylate (EGDMA), di(ethylene glycol) dimethacrylate, tri(ethylene glycol) dimethacrylate, N,N'-(1,2-dihydroxyethylene) bisacrylamide, and any combination thereof.

* * * * *